Jan. 9, 1951   B. A. KNAUTH ET AL   2,537,677
APPARATUS EMPLOYING THYRATRON TUBE CONTROL
Filed March 1, 1948   2 Sheets-Sheet 1

INVENTORS
BERTHOLD A. KNAUTH
AND PAO H. CHIN
BY
Semmes, Keegin, Robinson & Semmes
ATTORNEYS Jan. 9, 1951   B. A. KNAUTH ET AL   2,537,677
APPARATUS EMPLOYING THYRATRON TUBE CONTROL
Filed March 1, 1948   2 Sheets-Sheet 2

INVENTORS
BERTHOLD A. KNAUTH
AND PAO H. CHIN
BY
Semmes, Keegin, Robinson & Semmes
ATTORNEYS Patented Jan. 9, 1951

2,537,677

UNITED STATES PATENT OFFICE 2,537,677

APPARATUS EMPLOYING THYRATRON TUBE CONTROL

Berthold A. Knauth, Bolton, N. Y., and Pao Hsiung Chin, Cranford, N. J., assignors, by direct and mesne assignments, to The Motorspeed Corporation, New York, N. Y.

Application March 1, 1948, Serial No. 12,328

6 Claims. (Cl. 318—345)

Our invention relates to controlling the firing angle of thyratron tubes in which it has many applications, such as arc-welding, resistance welding, servo mechanisms, the control of the rate of rotation of electric motors, and other applications which will be apparent from the ensuing description.

While the drawings illustrate the system as applied to the control of the rate of rotation of a direct current motor, it will be apparent that the system has many other applications in industry where similar electrical conditions are desired in operating circuits.

In the particular illustrations which we have shown in the drawings, one of the important objects of the invention is to maintain a constant speed, with automatic compensation for change in the load imposed on the motor. A particular use for this system is to maintain a constant speed in, for instance, a pumping mechanism, where the motor may be subjected to varying loads by reason of the change in viscosity of the liquid which is being pumped.

In controlling the firing of thyraton tubes, which are grid-controlled gaseous discharge devices that permit the passage of current in only one direction, there are several factors which in general effect the firing of the tubes. Control of the output of the tubes can be effected by controlling the firing angle which is dependent on a combination, among others, of the following factors: (1) The grid-to-cathode potential, or grid bias, of the tube as effected by the net instantaneous algebraic sum of the voltages applied to the grid; (2) the simultaneously occurring anode-to-cathode potential of the tube which is the net instantaneous algebraic sum of all the voltages applied to the anode, which in this instance includes both the alternating supply voltage and the counter E. M. F. of the motor armature. It is believed to be unnecessary to fully explain the operation of the combination of factors above mentioned. However, it can be stated that we have achieved improvements in the creation and control of these factors over other systems known in the art.

Another object of this invention is to provide a thyratron motor control circuit in which the thyratron circuit is provided with inherent current limiting action.

Still another object of this invention is to provide an electronic motor control circuit in which automatic current limiting action is employed so as to limit the current supplied to the motor to values that the motor can safely carry.

A further object of this invention is to provide a motor circuit with automatic current limiting apparatus employing electronic devices substantially to prevent over-heating of the armature conductors or commutation failure due to overload.

Still another object of this invention is to provide a thyratron motor control circuit in which means is provided in the thyraton anode circuit for the purpose of controlling the calibration of the thyratron grid or control circuit in such a manner as to provide an effective current limiting action so as to substantially prevent excessive current from flowing through the motor.

Still a further object of this invention is to provide a grid controlled rectifier of the gaseous discharge type with a circuit arrangement in which radio interference set up by transient potentials of high frequencies in the rectifier circuit are minimized.

Further objects of this invention will be apparent to those skilled in the art to which it relates from the following specification, claims and drawing.

Figure 3:
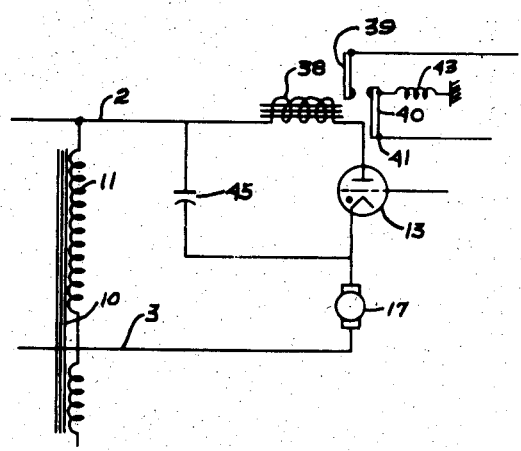
Figure 4:
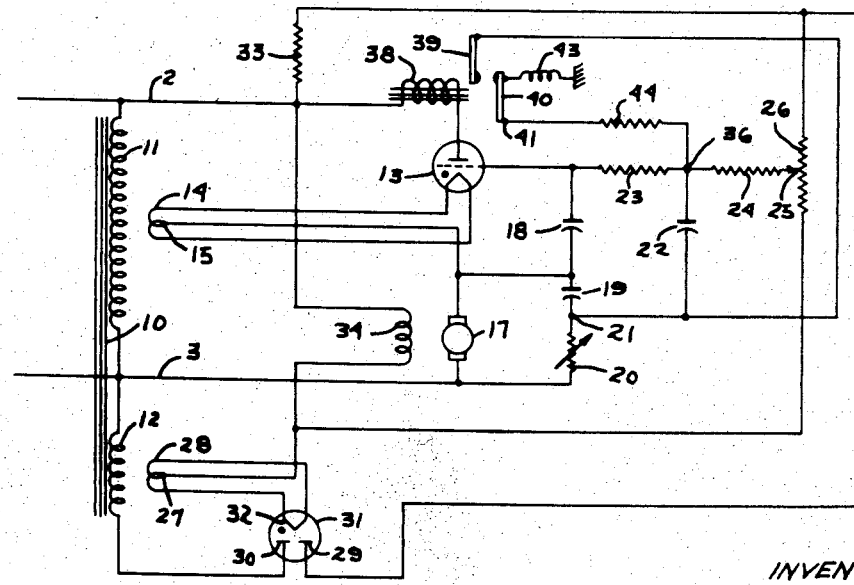

Figure 3 is a schematic wiring diagram of part of the thyratron circuit in which there is provided an over-current relay, the winding of which also functions as part of a radio interference filter; and, Figure 4 is a thyratron control circuit in which there is provided a relay that closes momentarily on each current pulse when the magnitude of the current exceeds the predetermined value to cause the firing of the thyratron to be retarded.

Figure 1:
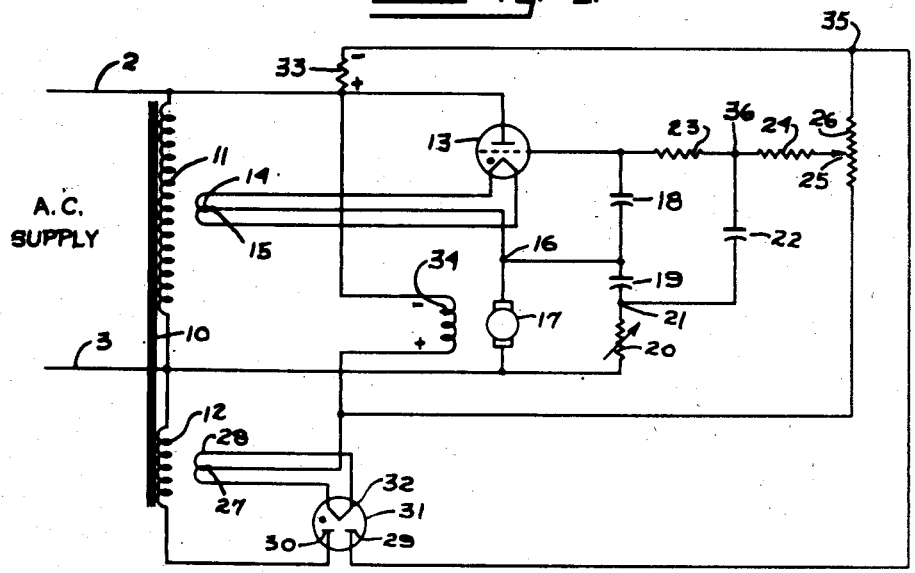
Figure 1 is a schematic wiring diagram of a motor control circuit employing a thyratron.

In the apparatus illustrated in Figure 1 the power supply for the circuit is obtained from lines 2 and 3 of an alternating potential source of substantially constant voltage. The winding 11 of the transformer 10 is connected across the lines 2 and 3, and inductively coupled to the winding 11 in auto-transformer relation is another winding 12. The anode of the thyratron 13 is connected to the line 2 and the cathode is connected to the low voltage secondary 14 of the transformer 10. The center tap 15 of the secondary 14 is connected to the point 16 which is connected to the upper brush of the motor armature 17 and to the junction between the capacitors 18 and 19.

The lower brush of the armature 17 is connected with line 3 and to the resistor 20. The resistor 20 and the capacitor 19 are connected in series across the armature 17 and the junction 21 between the resistor 20 and capacitor 19 is connected to the lower terminal of the capacitor 22. The other terminal of the capacitor 22 is connected to point 36. Point 36 connects to one side of grid current limiting resistor 23, which is connected to the grid of the thyratron 13 and to the upper terminal of the transient by-pass capacitor 18. The other terminal of this resistor 23 is connected to the resistor 24 and through this latter resistor to the slider 25 of the potentiometer 26. The lower terminal of the potentiometer 26 is connected to the center tap 27 of the secondary 28 and the upper terminal is connected to the anode 29 of the rectifier 31 and to the upper terminal of the resistor 33, the lower terminal of the resistor 33 being connected to the line 2.

The secondary 28 is provided for the purpose of heating the cathode 32 of the rectifier 31 and the center tap 27 of this secondary 28 is also connected to the lower terminal of the motor field 34, the upper terminal of this field 34 being connected to the line 2. The secondary 28 is inductively coupled to the winding 11 of the transformer 10 as is also the secondary 14. The anode 30 of the rectifier 31 is connected to the lower terminal of the secondary 12 and the upper terminal of this secondary is connected to the line 3 so that the anode 30 and the cathode 32 of the rectifier 31 function to rectify the voltage across the windings 11 and 12 and supply the motor field winding 34.

The shunting diode 29—32 part of this rectifier circuit shunts the field winding 34 during the negative half cycle of the supply voltage on diode 30—32 and has a resistor 33 in series with the shunting path.

The circuit for the grid phase control of the thyratron 13 consists of the potentiometer 26 connected across the resistor 33 and field winding 34. The potential between the slider 25 of the potentiometer 26 and the line 2 determine the magnitude and polarity of the direct potential across the capacitor 22 that is being used as a direct potential reference potential in the thyratron grid circuit. The use of the resistor 33 permits the capacitor 22 to be charged negatively, that is, the point 36 may be made negative with respect to the point 21, when the slider 25 of the potentiometer is moved to the end of the potentiometer closest to the point 35. This negative potential is necessary if it is desired to run the motor at a very low speed or if it is desired to smoothly adjust the motor speed by manipulating the slider 25 of the potentiometer.

The capacitor 19 and the adjustable resistor 20 are also included in the grid phase control circuit of the thyratron 13. The resistance of the adjustable resistor 20 determines the wave form of the potential across the capacitor 19 and this in turn determines the manner in which the motor speed varies with the load. The grid circuit of the thyratron also includes the resistor 24 and the capacitor 22 that are connected in series between the slider 25 of the potentiometer and the point 21 between the resistor 20 and the capacitor 19. An alternating potential, which is relatively small in magnitude and is approximately ninety electrical degrees out of phase lagging with respect to the potential of the a. c. supply connected to the lines 2 and 3, is provided across the capacitor 22 because of the phase shifting action of the resistor 24 and capacitor 22.

The direct potential between the slide 25 of the potentiometer and the line 2 also appears across the capacitor 22 as previously described. Thus in this circuit the capacitor 22 provides both the phase shifted alternating potential for the thyratron grid phase control and the direct potential of reversible polarity and variable magnitude for comparison with the modified armature counter E. M. F. across the capacitor 19 to pre-set the speed of the motor.

Figure 2:
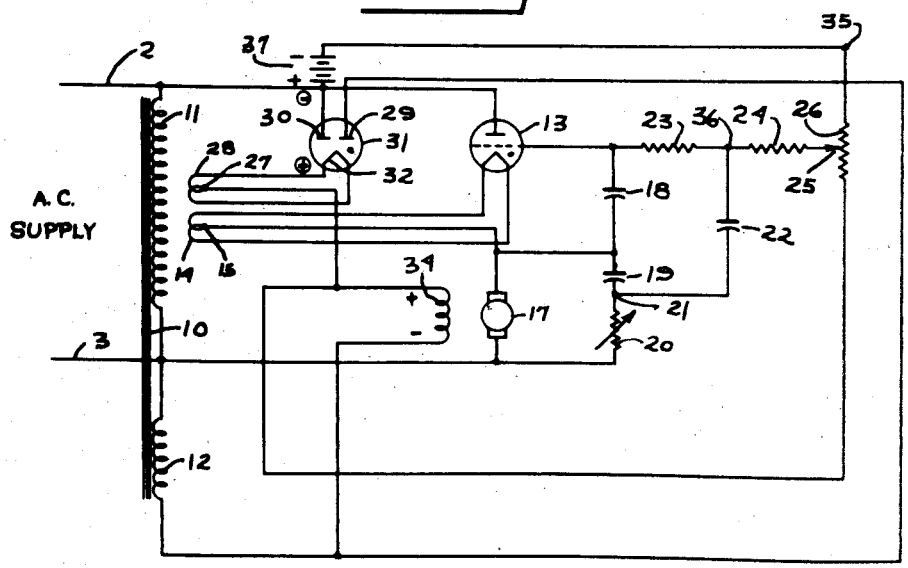
Figure 2 is another schematic wiring diagram of a thyratron motor control circuit in which an auxiliary D. C. supply is connected between the anode of the thyratron and the grid circuit.

In Figure 2 there is illustrated an arrangement similar to that shown in Figure 1 except that the modified connections to the rectifier 31 and the motor field winding 34 are provided and a source of direct current 37 is provided with a positive terminal thereof connected to the line 2 and the negative terminal thereof is connected to the point 35. Corresponding parts of Figures 1 and 2 are designated by the same reference numerals.

In Figure 2 the anode 29 of the rectifier 31 is connected to the lower terminal of the field 34 and to the lower terminal of the secondary 12. The anode 30 of this rectifier 31 is connected to the line 2 and the cathode 32 is connected to the secondary 28, the center tap 27 of which is connected to the upper terminal of the field 34 and to the lower terminal of the potentiometer 26. Thus, the potentiometer 26 is connected across the source of D. C. potential 37 and across the cathode 32 and anode 30 of the rectifier 31 so that the inverse voltage across this part of the rectifier 31 is used to produce a positive direct potential across the capacitor 22 and the direct potential of the source 37 is used to produce the negative direct potential across the capacitor 22 when the slider 25 of the potentiometer 26 is moved so as to be close to the point 35.

In Figure 4 of the drawing is illustrated a thyratron circuit arrangement such as shown in Figure 1, provided with a relay 38 that is connected in series with the anode of the thyratron 13 and the line 2. This relay 38 is provided with a stationary contact 39 and an armature 40 that is biased by the spring 43 in a normally open position. The stationary contact 39 is connected to the lower terminal of the capacitor 22 and to the point 21 between the capacitor 19 and the variable resistor 20. The armature 40 is connected to one terminal of resistor 44, the other terminal of this resistor 44 being connected to the point 36. It will therefore be observed that when the armature 40 engages the contact 39 the resistor 44 is connected across the capacitor 22.

The relay 38 is provided with a core of magnetic material and the winding is wound on or made a part of the core. This winding is connected so that the anode current of the thyratron flows through it so as to magnetize the core. The armature 40 is made of magnetic material so as to be attracted to the core of the relay 38. This armature is pivoted at the point 41 and spring biased away from the relay core as explained above.

When pulses of unidirectional current flow through the thyratron 13 and through the relay winding 38 the armature 40 is caused to vibrate and its amplitude of vibration is determined by the magnitude of the current pulses passing through the relay winding. By adjusting the location of the contact 39 in relation to the armature, or by suitably biasing the armature 40, it may be caused to close the contacts when the current in the relay winding exceeds a predetermined value. When these contacts are closed by the aforesaid excessive current pulse or pulses, the capacitor 22 is momentarily connected across the resistor 44 so that the capacitor 22 is discharged. The function of the resistor 44 is to prevent high initial current from flowing through the relay contacts when they are closed and thus to prolong the operating life of the contacts.

This reduction of the charge of the capacitor 22 reduces the current through the thyratron by causing the thyratron to fire later in the cycle, and as a result, the contacts of the relay will not close on the succeeding current pulse through the thyratron. Successive opening and closing of the relay contacts therefore operates to cause the average thyratron current to stay within the predetermined value.

When thyratron tubes are used to energize a load from an alternating potential power source, transient potentials of high frequencies are produced in the circuit. These high frequency potentials are often the source of very objectionable radio interference to neighboring radio receivers. One circuit arrangement which has been found to be very effective in minimizing such radio interference is shown in Figure 3. In this figure the inductance of the winding of the relay 38, that is connected in the anode circuit of the thyratron 13, and a capacitor 45 are employed as a noise suppression circuit. The high frequency potentials are attenuated or snubbed by the capacitor 45 which is discharged through the winding of the relay 38 and the thyratron 13. Thus, the capability of these high frequency potentials to set up objectionable radio interference to neighboring radio receivers by direct radiation or via supply lines 2—3 is minimized.

While we have shown our system as applied to a motor control, it will be obvious that the system is useful in many other connections, and that the immediate application has been illustrated and described merely to illustrate the invention. We desire that our invention be limited only by the scope of the appended claims and the showing of the prior art.

We claim:

1. A thyratron control system for controlling a direct current motor comprising a thyratron having an anode, a grid and a cathode, a direct current motor having an armature connected in series with said thyratron across an alternating current supply, a phase shifting network including a capacitor connected to said thyratron grid and said alternating current supply, a source of direct current supply, a potentiometer connected to said source of direct current supply, connections for connecting the slider of said potentiometer to said phase shifting network whereby D. C. charge may be applied to the capacitor of said phase shifting network, and a relay for momentarily discharging said capacitor when the current through said thyratron is excessive.

2. A thyratron control system for controlling a direct current motor comprising a thyratron having an anode, a grid and a cathode, a direct current motor having an armature connected in series with said thyratron across an alternating current supply, a phase shifting network connected between said thyratron grid and said alternating current supply, a source of direct current supply, a potentiometer connected to said source of direct current supply, a capacitor and a resistor connected in series across said motor armature, means for connecting the grid circuit of said thyratron to the junction between said capacitor and said resistor, connections for connecting the slider of said potentiometer to said phase shifting network for controlling the polarity of the D. C. charge applied to the capacitor of said phase shifting network for controlling the speed of said motor, a relay connected in series with said thyratron and connections for connecting the contacts of said relay to the terminals of said capacitor of said phase shifting network, said relay being responsive to excessive current through said thyratron to momentarily discharge said last mentioned capacitor through said relay contacts.

3. A thyratron control system for controlling a direct current motor comprising a thyratron having an anode, a grid and a cathode, a direct current motor having an armature connected in series with said thyratron across an alternating current supply, a phase shifting network connected between said thyratron grid and said alternating current supply, a source of direct current supply, a potentiometer connected to said source of direct current supply, a capacitor and a resistor connected in series across said motor armature, means for connecting the grid circuit of said thyratron to the junction between said capacitor and said resistor, connections for connecting the slider of said potentiometer to said phase shifting network for controlling the polarity of the D. C. charge applied to the capacitor of said phase shifting network for controlling the speed of said motor, a relay connected in series with said thyratron, and a resistor connected to said relay contacts and to the terminals of said capacitor of said phase shifting network, said relay being responsive to excessive current through said thyratron to momentarily discharge said last mentioned caacitor through said relay contacts and said last mentioned resistor.

4. A thyratron control system for controlling a direct current motor comprising a thyratron having an anode, a grid and a cathode, a direct current motor having an armature coupled to the cathode of said thyratron, a field for the direct current motor, a source of alternating current connected to said thyratron anode and to said motor armature, means for rectifying said alternating current to supply direct current pulses to said field winding, a phase shifting network connected to said alternating current supply and to said thyratron grid, said phase shifting circuit including a capacitor, a relay having a coil in series with the thyratron, connections for connecting the contacts of the relay to the phase shifting network to shunt the capacitor when the relay is closed, and a capacitor connected between the cathode of the thyratron and the source of alternating current supply connected to the anode.

5. A thyratron control system for controlling a direct current motor comprising a thyratron having an anode, a grid and a cathode, a direct current motor having an armature connected in series with said thyratron across an alternating current supply, a field for the motor, a phase shifting network including a capacitor connected to said thyratron grid and said alternating current supply, a rectifier having its cathode connected to the field of the motor, said rectifier and motor field being connected in series across the alternating current supply, a resistance connected to the negative terminal of the field winding, a potentiometer connected across the field winding and resistance, said potentiometer having its sliding contact connected to the grid phase shifting circuit to introduce a direct current potential in the grid phase shifting circuit.

6. A thyratron control system for controlling a direct current motor comprising a thyratron having an anode, a grid and a cathode, a direct current motor having an armature connected in series with said thyratron across an alternating current supply, a field for the motor, a phase shifting network including a capacitor connected to said thyratron grid and said alternating current supply, a rectifier having its cathode connected to the field of the motor, said rectifier and motor field being connected in series across the alternating current supply, a source of direct current potential connected to the alternating current supply, a potentiometer connected to the cathode of the rectifier and said source of direct current supply, said potentiometer having a sliding contact connected to the phase shifting circuit, said rectifier producing a more positive bias on the thyratron grid and said direct current source introducing a negative component of grid bias.

BERTHOLD A. KNAUTH.
PAO HSIUNG CHIN.

REFERENCES CITED

The following references are of record in the file of this patent:

UNITED STATES PATENTS

| Number | Name | Date |
|---|---|---|
| 2,082,496 | Howe | June 1, 1937 |
| 2,413,070 | Reeves | Dec. 24, 1946 |